United States Patent
Kasahara et al.

[11] 3,720,471
[45] March 13, 1973

[54] METHOD FOR MEASURING PLATE THICKNESS

[75] Inventors: Ichiro Kasahara, Mitaka-shi, Tokyo; Hideki Yamaguchi, Toshima-ku, Tokyo, both of Japan

[73] Assignee: Nihon Denski Kabushiki Kaisha, Tokyo, Japan

[22] Filed: Feb. 25, 1970

[21] Appl. No.: 13,976

[52] U.S. Cl. ................................................356/108
[51] Int. Cl. ................................................G01b 9/02
[58] Field of Search .............................. 250/219 TH; 356/106–113

[56] References Cited

UNITED STATES PATENTS

| | | | |
|---|---|---|---|
| 3,319,515 | 5/1967 | Flournoy | 356/108 |
| 3,549,870 | 12/1970 | Lay | 356/106 X |
| 2,848,921 | 8/1958 | Koulikovitch | 356/106 |
| 3,409,375 | 11/1968 | Hubbard | 356/106 |
| 3,354,311 | 11/1967 | Vali et al. | 356/106 |

OTHER PUBLICATIONS

"Wavelength or Length Measurement by Reversible Fringe Counting JOSA; Vol. 43, No. 6, pg. 505t.

Primary Examiner—Ronald L. Wibert
Assistant Examiner—Conrad Clark
Attorney—Webb, Burden, Robinson & Webb

[57] ABSTRACT

A method for measuring an increase or decrease in the thickness of a transparent glass or plastic plate, by differentiating between the convergence and divergence of an interference fringe pattern caused by the increase or decrease in the thickness of the plate when it is moved passed a testing station. The interference fringe pattern is created by directing a non-parallel pencil or wedge of rays on the plate. The resulting two sets of rays being reflected by the front and rear surfaces of the plate are directed and focused to a light detector. By detecting the convergence or divergence of the fringe pattern and counting the fringe rings passing the detector, the change in thickness of the plate is measured.

6 Claims, 12 Drawing Figures

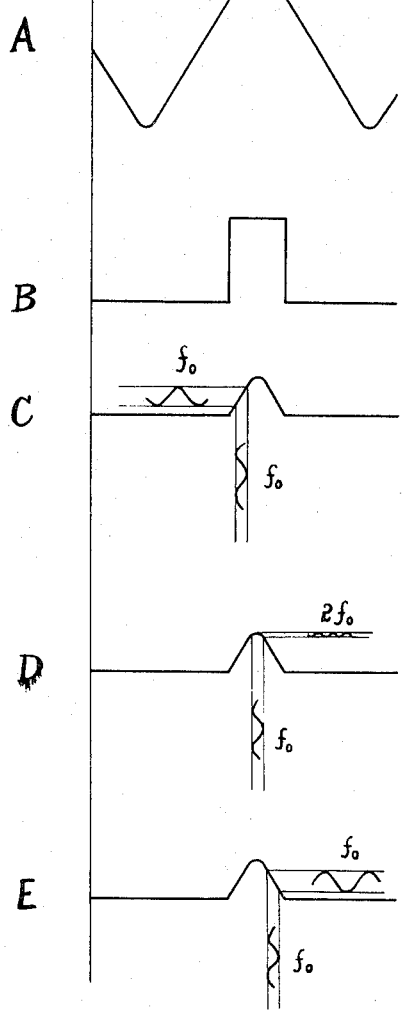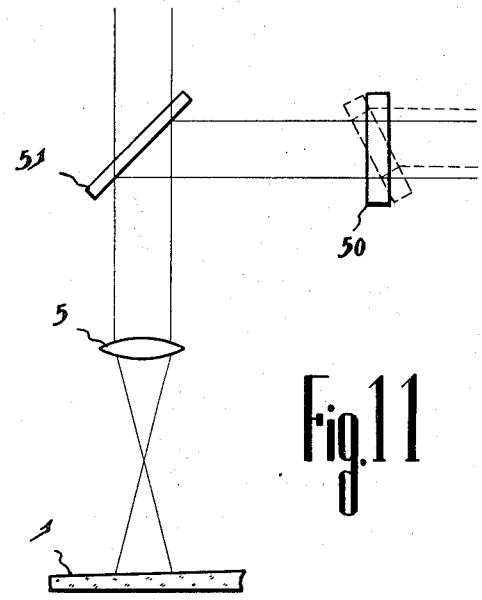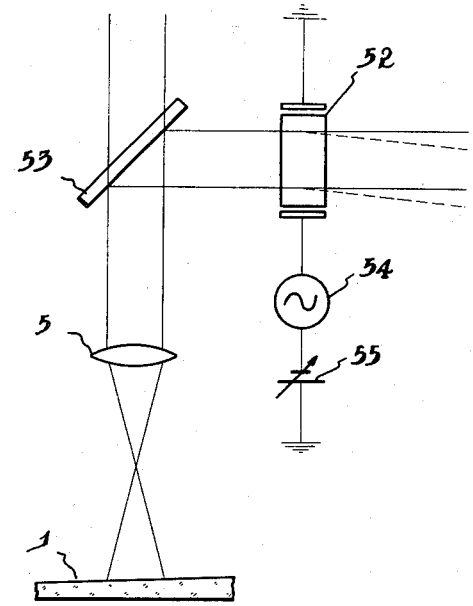

METHOD FOR MEASURING PLATE THICKNESS

This invention relates to a method for measuring the thickness of transparent; for example, glass or plastic plates. More particularly, it relates to a method of optically measuring the thickness of the plates.

One manner of measuring plate thickness is to use a micrometer. This method is unsatisfactory, because it is impossible to measure the plate thickness continuously. Further, the measurement precision of a micrometer is limited to about 1 micron.

Interferometers have been used to measure plate thickness with a measurement precision in the order of one wavelength. Even so, parallel light rays have been irradiated on the plate resulting in a parallel interference fringe pattern. This pattern, permits the relative variation of the plate thickness to be measured by a light detector, such as a phototransistor, or counting the number of fringes moving across the detector. This interferometer technique has a drawback: fringes move in one direction only, making it impossible to determine whether the variation in plate thickness is a decrease or increase.

In present invention, either convergent or divergent rays are used for irradiating the plate. As a consequence, a ring, eliptical or parallel fringe pattern is produced by interference of the two rays reflected by the front and rear surfaces of the said plate. Since the fringes in the pattern have a divergent movement, i.e., an outward movement from center to periphery, when the thickness of the plate increases and a convergent movement, i.e., an inward movement from periphery to center, when the thickness of the plate decreases, it is possible to determine increase or decrease of the plate thickness.

Briefly according to this invention, a transparent plate is moved relative to a testing station. A pencil or wedge of non-parallel coherent rays are directed at the plate. The resulting two sets of rays are directed and focused at a light detector to create an interference fringe pattern. As the thickness of the plate passing the test station increases or decreases, the interference fringe pattern diverges or converges. The divergence or convergence of the fringe pattern is measured at the light detector and the fringe rings are counted moving across the light detector.

According to a preferred method of this invention, aberration of the fringe pattern resulting, for example, from a portion of the plate having non-parallel faces is corrected by modulating the rays entering the light detector with a constant modulating frequency and comparing the phase of the modulated output of the light detector with the modulating frequency to detect aberration of the fringe. The fringe pattern is then refocused if necessary on the light detector.

It is an advantage of the present invention that not only an absolute change in thickness of the plate is detected, but the direction of the change; that is, increasing or decreasing thickness is determined. It is another advantage of this invention that the fringe center aberration may be corrected providing more accurate readings.

Various other objects and advantages of this invention will become apparent from the following detailed description made with reference to the accompanying drawings in which:

FIG. 10 shows wave forms produced by the various electrical units constituting the embodiment shown in FIG. 8.

FIG. 11 shows a sixth embodiment of the invention in which a means, in the form of a vibrating parallel glass plate, has been incorporated for correcting fringe center aberration.

FIG. 12 shows a seventh embodiment of the invention in which the correcting means for fringe center aberration takes the form of an electro-optical element.

Figure 1:
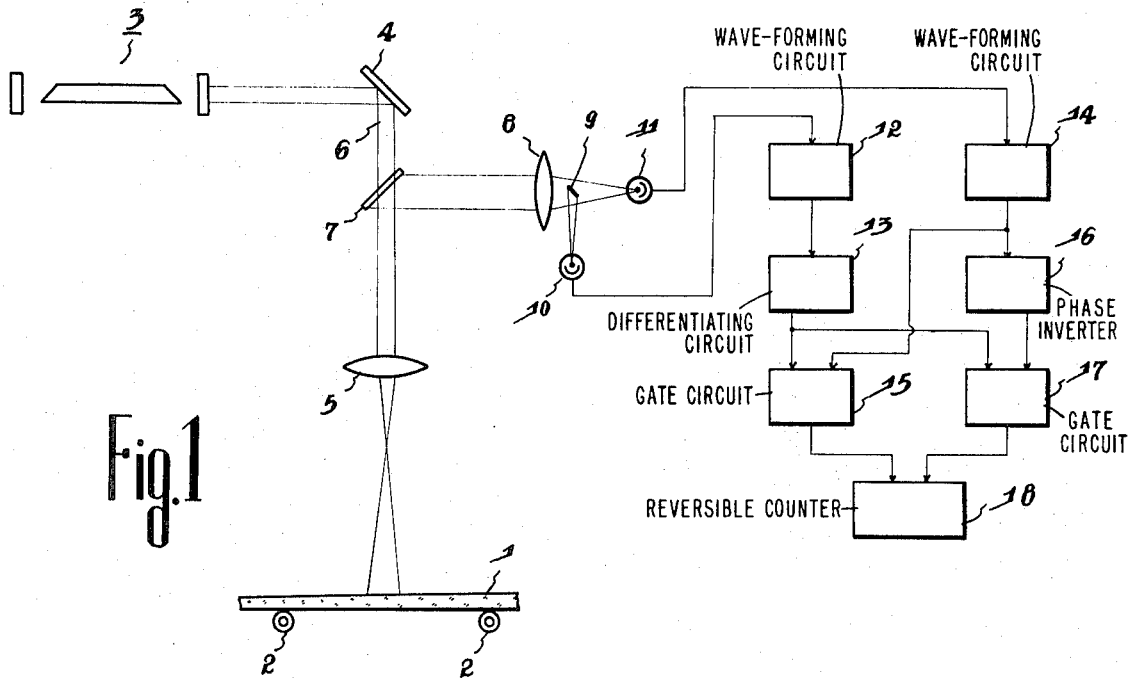
FIG. 1 shows one embodiment of the invention in which a convex lens is used for producing a divergent pencil of rays.

Referring to FIG. 1, a glass plate 1 is moved unidirectionally on rollers 2 at a constant speed. Coherent rays generated by a laser 3, such as a He-Ne laser, are reflected by a reflector 4 so as to pass through a convex lens 5 at the focal point of which the rays are diverged and irradiated on the glass plate 1.

Figure 2:
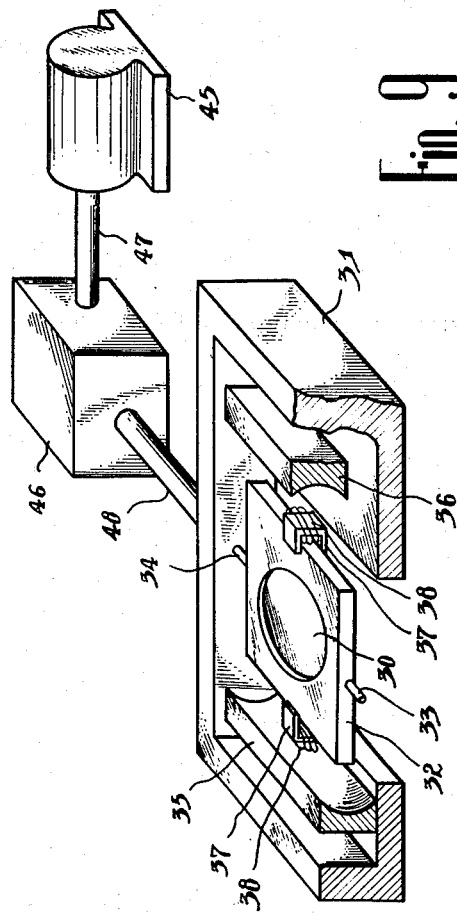
FIG. 2 shows a ring fringe pattern produced by the embodiment shown in FIG. 1.

A portion of the rays irradiating the plate are reflected by the plate's front surface. The remaining portion penetrate the front surface of the plate, a portion of which are reflected by the rear surface of the plate. As a result, an interference fringe pattern is produced by the two sets of rays. If a screen (not shown) is inserted in the light path 6, a ring fringe pattern as shown in FIG. 2 will appear on the screen.

Now even if the vicinity of the center of the fringe is observed, the distance between plate 1 and the screen and between the lens 5 and plate 1 is immaterial as far as the fringe pattern is concerned, but the plate thickness is quite pertinent. The fringe intensity is maximum when the following equation is satisfied:

$$2nd = \lambda N$$

where $n$ is the refractive index of the plate, $d$ is the plate thickness, $\lambda$ is a wave length of the rays irradiating the plate and $N$ is an integer. Therefore, the variation in plate thickness is known by the variation of $N$. Further, the increase or decrease of plate thickness is ascertained according to fringe divergence or convergence respectively.

The two sets of rays reflected by the front and rear surfaces are reflected by a half mirror 7, positioned in the light path 6, and pass through a convex lens 8. The center portion of the rays passing through the convex lens 8 is reflected by a reflector 9 so as to enter a phototransistor 10. On the other hand, the outer, peripheral portion of the said rays enters a phototransistor 11. The intensity of the rays detected by either of the phototransistors is increased or decreased according to the phase difference of the light waves of the two sets of rays reflected by the front and rear surfaces of the plate.

Figure 3:
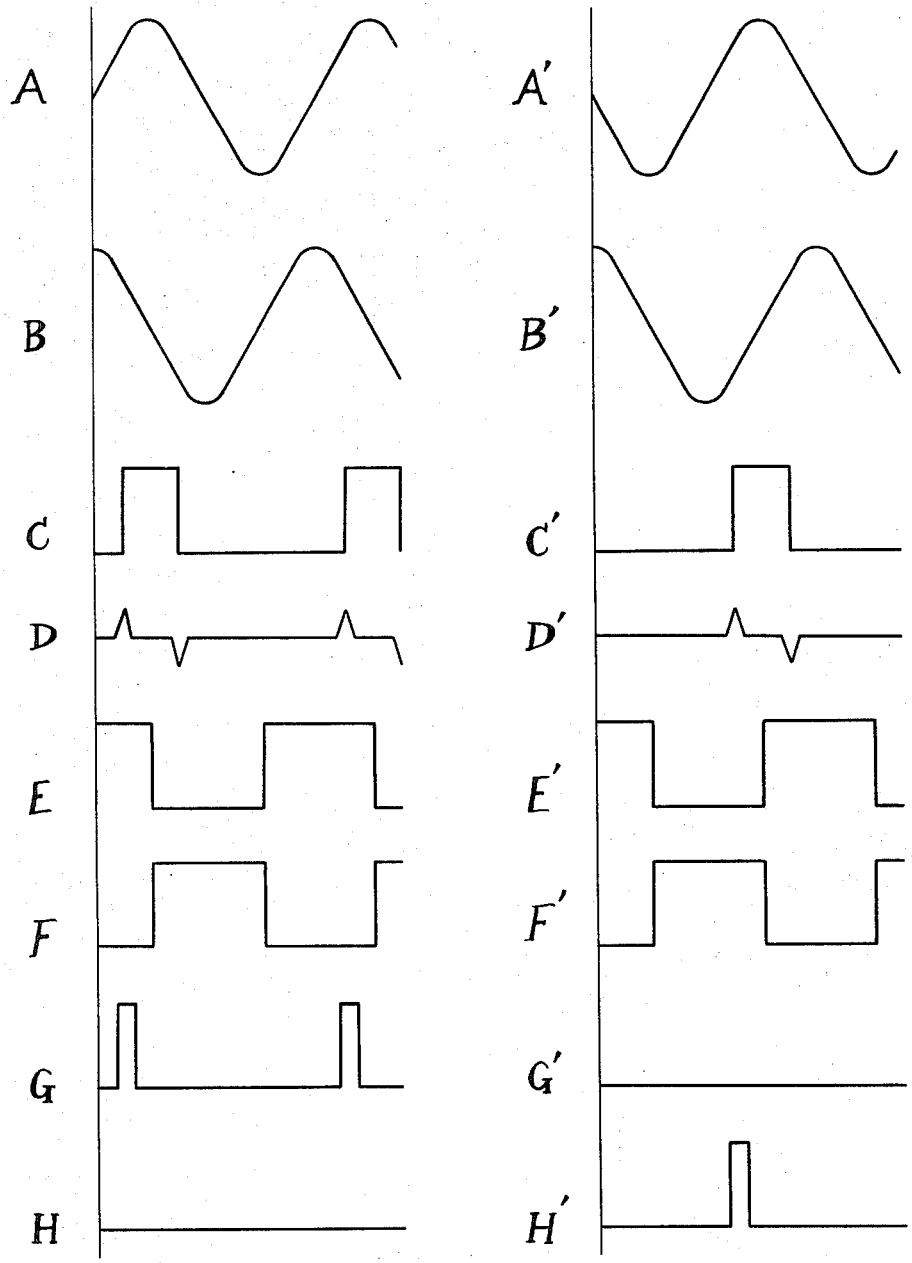
FIG. 3 shows the wave forms produced by the various electrical units constituting the embodiment shown in FIG. 1.

Now, in the event that the ring fringe pattern diverges due to an increase in the thickness of the portion of the plate being irradiated by the divergent pencil of rays, a fringe signal as shown in FIG. 3A is detected by the phototransistor 10 and a fringe signal as shown in FIG. 3B detected by the phototransistor 11. The respective phases of the two fringe signals are different, the difference being made about $\pi/2$. The phase of the signal detected by the phototransistor 10 leads that of the signal detected by the phototransistor 11.

The signal detected by the phototransistor 10 is used as a gate signal and is converted into a signal as shown in FIG. 3C by a wave-forming circuit 12. The output of the wave-forming circuit 12 is converted into pulses as shown in FIG. 3D by a differentiation circuit 13. The signal detected by the phototransistor 11, on the other hand, is converted into a signal as shown in FIG. 3E by a second wave-forming circuit 14. The outputs of the differentiation circuit 13 and the wave-forming circuit 14 are fed into a gate circuit 15. When the two signals are simultaneously positive, a series of pulses as shown in FIG. 3G are produced by the gate circuit 15.

The output of the wave-forming circuit 14 is also fed into a phase inverter 16 where it is inverted to produce a signal as shown in FIG. 3F. The outputs of the differentiation circuit 13 and the phase inverter 16 are fed into a gate circuit 17. Since, in this case, the two signals are at no time simultaneously positive, no signal is produced by the gate circuit 17 (FIG. 3H).

In the case that the fringe converges with the movement of the glass plate 1, a fringe signal as shown in FIG. 3A' is detected by the phototransistor 10, the phase of the said signal lagging behind that of the signal as shown in FIG. 3A. However, the phase of the signal detected by the phototransistor 11 (FIG. 3B') neither leads nor lags that of the signal shown in FIG. 3B. As a result, a series of pulses is produced by the gate circuit 17 (FIG. 3H') and no signal is produced by the gate circuit 15 (FIG. 3G').

The outputs of the two gate circuits are fed into a reversible counter 18, where the output pulses are counted. The output pulses produced by the gate circuit 15 are plus-counted and the output pulses produced by gate circuit 17 are minus-counted. A recorder (not shown) connected to the reversible counter continuously records these plus and minus pulses according to the increase and decrease in plate thickness respectively.

Figure 4:
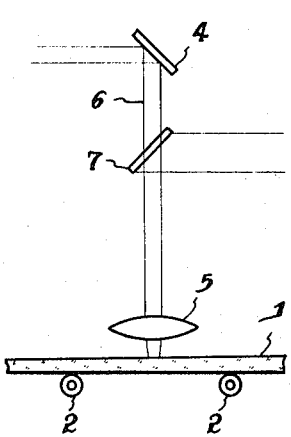
FIG. 4 shows a second embodiment according to the present invention in which a convex lens is used for producing a convergent pencil of rays.

In the embodiment just described, the pencil of rays produced by the convex lens irradiates the surface of the plate divergently. In the second embodiment shown in FIG. 4, however, the pencil of rays produced by the convex lens 5 irradiates the surface of the plate 1 convergently. In this case, the ring fringe pattern is produced by the two sets of rays reflected by the front and rear surfaces of the glass plate. The movement of the glass plate causes each fringe of the said fringe pattern to move convergently or divergently.

Figure 5:
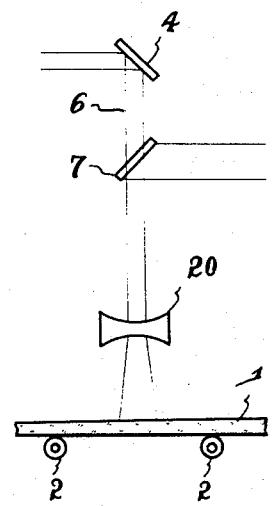
FIG. 5 shows a third embodiment of the invention in which a concave lens is used for producing a divergent pencil of rays.

In the third embodiment shown in FIG. 5, the pencil of rays is produced by a concave lens 20, the rays being irradiated on the plate surface divergently. In this case also, the ring fringe pattern is produced by the two sets of rays reflected by the front and rear surfaces of the glass plate 1. Again the movement of the glass plate causes each fringe of the said fringe pattern to move convergently or divergently.

Figure 7:
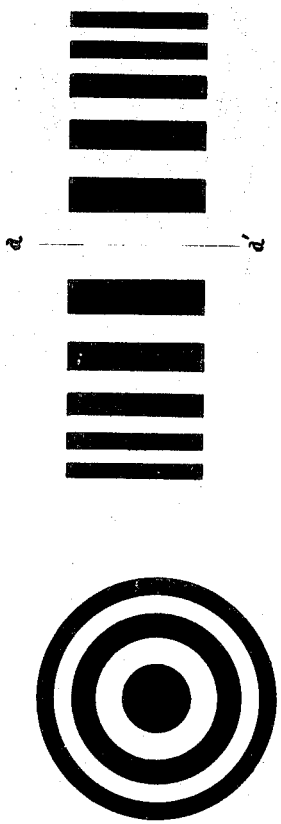
FIG. 7 shows a parallel fringe pattern produced by the fourth embodiment.
Figure 6:
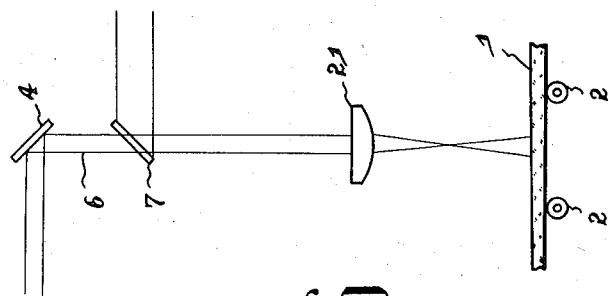
FIG. 6 shows a fourth embodiment of the invention in which a cylindrical lens is used for producing a divergent wedge of rays.

In the fourth embodiment shown in FIG. 6, a wedge of rays is produced by a cylindrical lens 21, the rays being unidirectionally irradiated on the plate surface either divergently or convergently. In this case, a parallel fringe pattern as shown in FIG. 7 is produced by the two sets of rays reflected by the front and rear surfaces of the glass plate. The movement of the glass plate causes each fringe of the said fringe pattern to symetrically move convergently or divergently with respect to line $a$-$a'$ as the center. Fringe convergence and divergence is differentiated by the same arrangement of electrical units as shown in FIG. 1.

It is possible to use other types of lenses in order to produce a divergent or convergent pencil of rays. For example, a cylindrical lens with one side concave can be used for the divergent rays. Again, the use of an eliptical lens is feasible. In this case, the two sets of rays reflected on the front and rear surfaces of the plate would produce an eliptical fringe pattern. The movement of the glass plate causes each fringe of the said fringe pattern to move convergently or divergently.

In the above described embodiments, the light intensities of the fringes are detected by the two phototransistors and the respective phases of the fringe signals detected by the said transistors are different. Further, the phase difference between the two signals must be kept constant in order to precisely differentiate between the convergent and divergent movements of the fringe. In the case when the front surface of the glass plate is not parallel to the rear surface, however, the central point or the center line of the fringe pattern is moved. As a result, the phase difference between the two signals cannot be kept constant and it is, therefore, impossible to differentiate between the convergent and divergent movements of the fringe pattern precisely.

Figure 9:
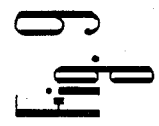
FIG. 9 shows a three-dimensional view of a mirror box used in the fifth embodiment.
Figure 8:
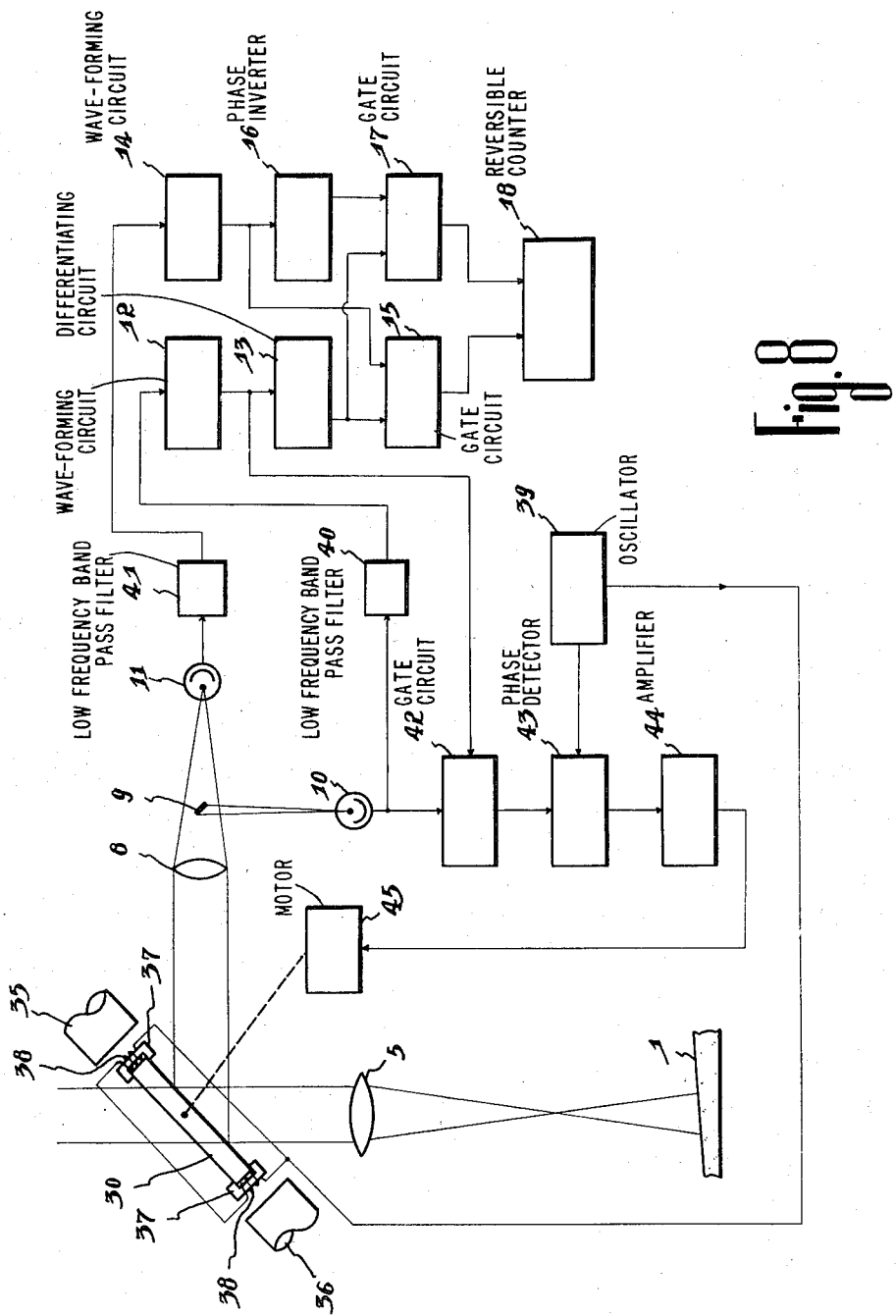
FIG. 8 shows a fifth embodiment of the invention in which a means, in the form of a vibrating half mirror, has been incorporated for correcting fringe center aberration.

In the fifth embodiment, the light signals which enter the phototransistors are modulated by a vibrating half mirror 30. Referring to FIGS. 8 and 9, the half mirror 30 is arranged in a mirror box 31 and supported by a mirror supporter 32. The said mirror supporter is, in turn, supported by two rods 33, 34 which are fixed to the box 31 so that the half mirror 30 turns on the rods freely. The mirror supporter is arranged between two magnets 35 and 36, having opposite polarities. Conductors 37 on which coils 38 are wound are fitted to two opposite ends of the mirror supporter, the said coils being contiguous to the magnets 35 and 36. The coils 38 are connected to an oscillator 39 which supplies an alternating current. As a result, the half mirror 30 is made to vibrate in accordance with the fluctuations of the said current.

In this case, the phototransistor 10 is connected to the wave-forming circuit 12 via a low frequency band pass filter 40 and the phototransistor 11 is connected to the wave-forming circuit 14 via a low frequency band pass filter 41 in order to differentiate between the convergent and divergent movements of the fringe pattern without being affected by the aforementioned modulation. Generally, the frequency of the fringe signal is less than 10Hz since the plate thickness does not vary abruptly and moreover, since the frequency of the alternating current supplied by the oscillator 39 is extremely high compared with the frequency of the fringe signal, the outputs of the two low-pass filters 40, 41 consist (as shown in FIG. 10A) of the fringe signal only.

The modulated fringe signal detected by the phototransistor 10 is fed into a gate circuit 42 and passes through the said gate circuit during the time that the pulses, as shown in FIG. 10B, are applied, said pulses having a limited time, being applied to the gate circuit 42 from the wave-forming circuit 12. FIGS. 10C, D and E show the signals passed through the gate circuit 42. In this embodiment, therefore, fringe center aberration is corrected only when the fringe center is bright.

When the fringe center is bright and the phototransistor 10 detects the left side slope of the waveform, the fringe signal is modulated by the AC frequency $f_o$ provided by the oscillator 39 (FIG. 10C). In this case, the phase of the modulated signal coincides with the phase of said AC frequency $f_o$ and as a result, a plus signal is produced by the phase detector 43. The output of the phase detector 43 is in turn fed into an amplifier 44, the amplified output of which is amplified to a motor 45 connected to a reduction gear 46 by a shaft 47. The reduction gear 46 is linked to the mirror box 31 by a shaft 48. By means of this arrangement, the mirror box 31 is rotated either clockwise or anticlockwise until the phototransistor 10 detects the maximum intensity of the fringe signal.

When the phototransistor 10 detects the top of the waveform (see FIG. 10D), however, the fringe signal is modulated by frequency $2f_o$ and the output of the phase detector is zero. In this case, the mirror box 31 does not rotate.

When the phototransistor 10 detects the right side slope of the wave form, the fringe signal is modulated by frequency $f_o$ (see FIG. 10E) whose phase lags behind the phase of the alternating current provided by the oscillator 39 by $\pi$. As a result, a minus signal is produced by the phase detector 43, the said signal being amplified by amplifier 44 and applied to the motor 45. In this case, therefore, the mirror box 31 is rotated but in the opposite direction to that when the phototransistor 10 detects the left side slope of the waveform.

However, when the fringe pattern diverges and the phototransistor detects the left side slope of the fringe signal waveform, the light intensity at the fringe center is stronger than that of the light intensity at the periphery of the center. Conversely, when the fringe pattern diverges and the phototransistor detects the right side slope of the fringe signal waveform, the light intensity at the fringe center is weaker than that at the periphery of the center. As a consequence of the above, it is desirable to narrow the width of the pulse supplied by the wave-forming circuit 12.

FIG. 11 shows the sixth embodiment which is a modification of the fifth embodiment. In this embodiment, a parallel glass plate 50 is arranged in the optical path between a stationary half mirror 51 and light detectors (not shown). With this arrangement, it is possible to rotate the said plate in the same manner as the half mirror shown in FIG. 9. The optical path passing through the parallel glass plate 50 moves parallel in accordance with the inclination on the said plate. As a result, the signals detected by the light detectors are modulated.

FIG. 12 shows the seventh embodiment which again is a modification of the fifth embodiment. In this embodiment, an electrooptical element 52, such as a KDP or ADP, is arranged in the optical path between a stationary half mirror 53 and light detectors (not shown). The direction of the optical path passing through the electro-optical element 52 changes in accordance with the voltage applied across the said element. An AC source 54 is used for modulating the fringe signal and a variable DC source 55 is used for correcting the aberration at the fringe center.

Having thus defined our invention in detail and with the particularity required by the patent laws, what is desired protected by Letters Patents is set forth in the following claims.

We claim:

1. A method for measuring the change in thickness of the transparent plate continuously moving relative to a light detector comprising central and peripheral detectors for detecting the central and one other fringe of an interferometer diffraction pattern produced by non-parallel coherent rays reflected from the surfaces of the transparent plate comprising the steps for:
   1. irradiating the said plate with non-parallel coherent rays;
   2. directing and focusing the resultant two sets of rays which are reflected by the front and rear surfaces of the said plate to the said light detector, the said two sets of rays producing interference fringe pattern at said detector which diverges or converges in accordance with the increase or decrease of the plate thickness;
   3. modulating the rays entering the said light detector central detector by a slight back and forth deflection at a constant modulation frequency according to a modulation signal;
   4. detecting and comparing the modulated fringe signal with the modulation signal and producing a control signal indicative of the phase shift which corresponds to the aberration at the center of the fringe pattern from the central detector;
   5. in response to said control signal mechanically driving means for focusing and correcting the aberration at the center of the fringe pattern;
   6. differentiating between the divergent and convergent movement of the fringe pattern by comparing the fringe signals detected by the central and peripheral light detectors; and,
   7. reversibly counting the number of fringes moving across the said light detector.

2. A method for measuring the thickness of the transparent plate according to claim 1 wherein the rays entering the light detector are modulated by vibrating a half mirror arranged in the path of the said rays.

3. A method for measuring the thickness of the transparent plate according to claim 1 wherein the rays entering the light detector are modulated by a vibrating parallel glass plate arranged in the path of said rays.

4. A method for measuring the thickness of the transparent plate according to claim 1 wherein the rays entering the said light detector are modulated by an electro-optical element arranged in the path of said rays.

5. The method according to claim 1 wherein the differentiation between the divergence and convergence movement of the fringe pattern is made by detecting with a first phototransistor (10) the intensity of the rays at the center of the fringe pattern and with the second phototransistor (11) the intensity of a peripheral portion of the fringe pattern, the phototransistors being arranged to produce signals of the same frequency space by about $\pi/2$, feeding the signal created by the first phototransistor (10) to a first wave-forming circuit (12) for creating a positive pulse output during a portion of the positive part of the input signal, feeding the output of the first wave-forming circuit (12) to a differentiation circuit (13) for creating a short positive or negative signal respectively at the start and finish of the pulse output of the first wave-forming circuit, simultaneously feeding the signal created at the second phototransistor (11) to a second wave-forming circuit (14) to form a pulse output during a positive portion of part of the input signal such that said pulse overlaps the output pulse of the first wave-forming circuit, feeding the output of the first differentiation circuit (13) and the second wave-forming circuit (14) to a first gate circuit (15) which produces a series of pulses when the inputs thereto are simultaneously positive, which occurs during divergence of the interference fringe as the output signal of first phototransistor leads the output signal the second phototransistor, feeding the output of the second wave-forming circuit to a phase inverter (16), feeding the output of the first differentiation circuit (13) and the phase inverter (16) simultaneously to a second gate circuit (17), which produces a series of signals when the inputs thereto are simultaneously positive, which occurs during convergence of the interference fringe pattern as the output signal of the first phototransistor drags behind the output signal of the second phototransistor and feeding the outputs of the first and second gate circuits (15, 17) to a responsive counter (18) wherein the output pulses of the first gate circuit are counted positive and the output pulses of the second gate circuit are counted minus.

6. A method according to claim 5 wherein aberration of the fringe pattern is corrected by modulating the rays entering the said light detector with the constant modulating frequency, passing the output signal of the first phototransistor (10) through a low frequency band pass filter (40) to the first wave-forming circuit (12), passing the output of the second phototransistor (11) to a low frequency band pass filter (41) to the second wave-forming circuit (14), simultaneously passing the modulated fringe signals from the first phototransistor (10) and the output from the first wave-forming circuit to a third gate circuit (42), passing the output of the third gate circuit to a phase detector circuit (43) which compares the modulated frequency to the modulating frequency to determine the nature of the aberration, and based upon the output of the phase detector circuit (14) mechanically refocusing the fringe pattern.

* * * * *